United States Patent
Abdalla (10) Patent No.: US 8,409,446 B2
(45) Date of Patent: Apr. 2, 2013

(54) AUTOMATIC DRAINING SYSTEM TO DRAIN FLUID FROM A FILTER

(75) Inventor: Wassem Abdalla, Cookeville, TN (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 247 days.

(21) Appl. No.: 12/860,499

(22) Filed: Aug. 20, 2010

(65) Prior Publication Data

US 2011/0041920 A1 Feb. 24, 2011

Related U.S. Application Data

(60) Provisional application No. 61/235,856, filed on Aug. 21, 2009.

(51) Int. Cl.
*B01D 17/032* (2006.01)
*F02M 37/22* (2006.01)

(52) U.S. Cl. ........ 210/744; 210/114; 210/124; 210/307; 210/313; 210/DIG. 5

(58) Field of Classification Search .......... 210/119, 210/114, 123, 124, 307, 308, 309, 313, 744, 210/767, DIG. 5; 137/172, 487.5
See application file for complete search history.

(56) References Cited

U.S. PATENT DOCUMENTS

| | | | |
|---|---|---|---|
| 4,136,009 A * | 1/1979 | Samiran | 210/114 |
| 4,334,989 A | 6/1982 | Hall | |
| 4,384,962 A * | 5/1983 | Harris | 210/788 |
| 4,491,143 A | 1/1985 | Yasuhara et al. | |
| 4,518,704 A | 5/1985 | Okabayashi et al. | |
| 5,366,520 A | 11/1994 | Tiemeyer | |
| 5,888,399 A * | 3/1999 | Rutledge et al. | 210/634 |
| 6,083,381 A | 7/2000 | Connelly et al. | |
| 6,444,121 B1 | 9/2002 | Maxwell | |
| 6,495,042 B1 | 12/2002 | Knight | |
| 6,783,665 B1 | 8/2004 | Girondi | |
| 6,881,328 B2 | 4/2005 | Dittmann et al. | |

(Continued)

FOREIGN PATENT DOCUMENTS

| | | |
|---|---|---|
| DE | 3701259 | 7/1987 |
| DE | 4006216 | 9/1991 |

(Continued)

OTHER PUBLICATIONS

Search Report for International Application No. PCT/US2010/046183, dated Apr. 29, 2011 (3 pages).

(Continued)

*Primary Examiner* — Terry Cecil
(74) *Attorney, Agent, or Firm* — Hamre, Schumann, Mueller & Larson, P.C.

(57) ABSTRACT

An automatic draining system is provided. The system includes a floating valve having a density less than a first fluid and greater than a second fluid. The floating valve has a floating position that allows the first fluid to pass through a floating valve opening when the floating valve compartment is filed with the first fluid, and a sealing position that prevents the first and second fluids from passing through the floating valve opening when the floating valve compartment is not filled with the first fluid. Also included is a solenoid valve in fluid communication with the floating valve compartment. The solenoid valve has a solenoid opening that is open when the solenoid valve is energized and is closed when the solenoid valve is de-energized. Further included is a filter media downstream of the solenoid valve that filters the first liquid prior to the first fluid exiting the system.

21 Claims, 8 Drawing Sheets

U.S. PATENT DOCUMENTS

| | | |
|---|---|---|
| 6,893,571 B2 | 5/2005 | Harenbrock et al. |
| 7,591,951 B2 | 9/2009 | Linhart et al. |
| 7,850,846 B2 * | 12/2010 | De La Azuela et al. ...... 210/295 |
| 2009/0166274 A1 | 7/2009 | Newby et al. |
| 2009/0173639 A1 | 7/2009 | Ferrari et al. |
| 2010/0096304 A1 | 4/2010 | Ganswein et al. |
| 2011/0011807 A1 | 1/2011 | Micke et al. |
| 2011/0088800 A1 | 4/2011 | Core |
| 2011/0284435 A1 | 11/2011 | Moser et al. |
| 2012/0031824 A1 | 2/2012 | Braunheim et al. |
| 2012/0080386 A1 | 4/2012 | Weindorf et al. |

FOREIGN PATENT DOCUMENTS

| | | |
|---|---|---|
| DE | 9115610 | 4/1993 |
| DE | 4409570 | 5/1995 |
| DE | 10138695 | 2/2003 |
| DE | 10150062 | 2/2003 |
| DE | 10160497 | 6/2003 |
| DE | 102004036070 | 2/2006 |
| DE | 102008012503 | 9/2009 |
| EP | 0483815 | 5/1992 |
| EP | 0585975 | 3/1994 |
| EP | 1081371 | 3/2001 |
| EP | 1126158 | 8/2001 |
| EP | 1581736 | 8/2007 |
| GB | 2065336 | 6/1981 |
| JP | 58219940 | 12/1983 |
| JP | 61234909 | 10/1986 |
| JP | 63224706 | 9/1988 |
| JP | 63224707 | 9/1988 |
| JP | 64011609 | 1/1989 |
| JP | 5286989 | 11/1993 |
| JP | 6041745 | 6/1994 |
| WO | 2008/023029 | 2/2008 |
| WO | 2008023029 | 2/2008 |

OTHER PUBLICATIONS

Written Opinion of the International Searching Authority for International Application No. PCT/US2010/046183, dated Apr. 29, 2011 (4 pages).

Michael Durst, "Filtration in Fahrzeugen," ("Filtration in vehicles"), 2002, p. 74-91.

* cited by examiner

AUTOMATIC DRAINING SYSTEM TO DRAIN FLUID FROM A FILTER

PRIORITY

This application claims the benefit of U.S. Provisional Application No. 61/235,856, entitled "AUTOMATIC DRAINING SYSTEM TO DRAIN FLUID FROM A FILTER", filed Aug. 21, 2009, and which is incorporated herein by reference in its entirety.

FIELD

The disclosure herein generally relates to filters. More particularly, the disclosure herein relates to an automatic draining system to drain fluid from a filter.

BACKGROUND

Improvements may be made upon existing designs of filters, more particularly, improvements may be made upon existing filters for providing an automatic draining system to drain fluid from the filter.

SUMMARY

Generally, an automatic draining system to drain fluid (e.g. water) from a filter is described that can be useful for preventing fuel from leaking to the ground.

The automatic draining system as shown and described herein improves filter performance by eliminating the possibility of water reaching the level of the filter media and not being drained out of the filter. The embodiments described herein also prevent fuel from getting in touch with the water filter media and used up to its capacity or from the fuel leaking down to the ground in case of a solenoid valve malfunction. The embodiments described herein also allow for a long contact time between the water and the filter media to achieve the best capacity and the best efficiency of the filter media.

The embodiments described herein also eliminate the need of manual water draining which will provide gasoline like type engine service, address the voices of the customer, and improve filter performance by eliminating the possibility of not draining the water out of the filter, which affects the filter performance if the water reaches the level of the filter media. The embodiments described herein also allow the automatic draining system to drain water with a HC-content of less than 2 ppm.

The embodiments provided herein describe the fluid as water. However, it is to be realized that the concepts described herein can be used for other fluids. For example, in appropriate circumstances, one or more of the concepts described herein can be applied to drain other types of fluids including, for example lubrication, hydraulic and other liquids.

Also, the embodiments described below are directed to systems for automatically draining water from a filter in a diesel engine. However, the concepts described herein can be used to drain water, or other types of fluids, from other types of engines or other devices that require a fluid to be drained from the device.

The embodiments provided below describe automatic draining systems that are removably attached to a fuel filter system of an engine. The automatic draining systems include a floating valve, a solenoid valve and a hydrocarbon filter. In some embodiments, the automatic draining system also includes a sump for storing a liquid.

In the embodiments described below, the solenoid valve and the hydrocarbon filter are designed to last the life of the engine. However, the solenoid valve and the hydrocarbon filter are removably attached to the automatic draining system to allow an operator to replace the solenoid valve and the hydrocarbon filter easily. Also, in embodiments where the automatic draining system includes the sump, the sump is also removably attached to the automatic draining system and the fuel filter system for easy replacement.

In one embodiment, an automatic draining system for a filter is provided. The automatic draining system includes a floating valve and a solenoid valve. The floating valve is housed within a compartment in fluid communication with a sump. Also, the floating valve has a density less than a first fluid and a density greater than a second fluid. The solenoid valve has an opening that is in fluid communication with the compartment and in fluid communication with filter media of the filter. When the first fluid reaches a certain level in the sump, the opening of the solenoid valve is opened which allows the first fluid to pass through the opening of the solenoid valve to the filter media until the floating valve seals the opening of the solenoid valve and prevents the second fluid from entering the filter media.

The floating valve can be in a variety of shapes. For example, in some embodiments, the floating valve is in the shape of a sphere. In other embodiments the floating valve is in the shape of a cylinder. In yet some other embodiments, a pin portion protruding from the floating valve. The pin portion prevents the floating valve from staying at a sealed position (due to system pressure) when there is water surrounding the floating valve. These are only some of the shapes that the floating valve can have, and one skilled in the art would understand that the floating valve can take on numerous other shapes.

In some embodiments, the filter is a hydrocarbon filter that includes a hydrocarbon filter media. For example, in one embodiment, the hydrocarbon filter media is an activated carbon filter media. However, any hydrocarbon filter media that removes hydrocarbons can be used.

In one embodiment, an automatic draining system for draining a first fluid from a filter is provided. The system includes a floating valve housed within a floating valve compartment. The floating valve has a density less than a first fluid and a density greater than a second fluid. The floating valve is in a floating position when the floating valve compartment is filed with the first fluid, allowing the first fluid to pass through the floating valve opening, and the floating valve is in a sealing position when the floating valve compartment is not filled with the first fluid, preventing the first and second fluids from passing through the floating valve opening. The system also includes a solenoid valve in fluid communication with the floating valve via the floating valve opening. The solenoid valve has a solenoid opening that is open when the solenoid valve is energized and is closed when the solenoid valve is de-energized. The system further includes a filter media downstream of the solenoid, wherein the filter media filters the first liquid prior to the first liquid exiting the automatic draining system.

In another embodiment, a method for automatically draining a first fluid from a filter using an automatic draining system is provided. The method includes moving a floating valve that has a density less than the first fluid and greater than a second fluid to a floating position by filling a floating valve compartment with the first fluid. The method also includes energizing a solenoid valve to allow the first fluid to enter the first fluid filter via a solenoid opening, wherein the solenoid valve is energized when the amount of the first fluid upstream the solenoid valve reaches a first level. The method further includes filtering the first fluid in the first fluid filter, and draining the first fluid out of the first fluid filter.

In yet another embodiment, a combined fluid filter system and automatic draining system is provided. The fluid filter system comprises a fluid filter for separating a first fluid from a second fluid. The automatic draining system comprises a floating valve housed within a floating valve compartment having a floating valve opening, the floating valve having a density less than the first fluid and a density greater than the second fluid, wherein the floating valve is in a floating position when the floating valve compartment is filed with the first fluid allowing the first fluid to pass through the floating valve opening, and the floating valve is in a sealing position when the floating valve compartment is not filled with the first fluid, thereby preventing the first fluid and the second fluid from passing through the floating valve opening. The automatic draining system also includes a solenoid valve downstream of and in fluid communication with the floating valve compartment via the floating valve opening, the solenoid valve having a solenoid opening that is open when the solenoid valve is energized and is closed when the solenoid valve is de-energized. Further, the automatic draining system comprises a filter media downstream of and in fluid communication with the solenoid valve via the solenoid valve opening, wherein the filter media filters the first liquid prior to the first liquid exiting the automatic draining system. Also, the automatic draining system is removably attached to the fuel filter system.

BRIEF DESCRIPTION OF THE DRAWINGS

The drawings herein show and provide description as to various inventive concepts of an automatic draining system for filters.

DETAILED DESCRIPTION

The embodiments described herein are directed to systems and methods for automatically draining a fluid from a filter. This description will hereinafter describe the fluid as water. However, it is to be realized that the concepts described herein can be used for other fluids. For example, in appropriate circumstances, one or more of the concepts described herein can be applied to drain other types of fluids including, for example lubrication, hydraulic and other liquids.

Also, the embodiments described below are directed to systems for automatically draining water from a filter in a diesel engine. However, the concepts described herein can be used to drain water, or other types of fluids, from other types of engines or other devices that require a fluid to be drained from the device.

The embodiments provided below describe automatic draining systems that are removably attached to a fuel filter system of an engine. The automatic draining systems include a floating valve, a solenoid valve and a hydrocarbon filter. In some embodiments, the automatic draining system also includes a sump for storing a liquid. In the embodiments described below, the solenoid valve and the hydrocarbon filter are designed to last the life of the engine. However, the solenoid valve and the hydrocarbon filter are removably attached to the automatic draining system to allow an operator to replace the solenoid valve and the hydrocarbon filter easily. Also, in embodiments where the automatic draining system includes the sump, the sump is also removably attached to the automatic draining system and the fuel filter system for easy replacement.

Figure 1:
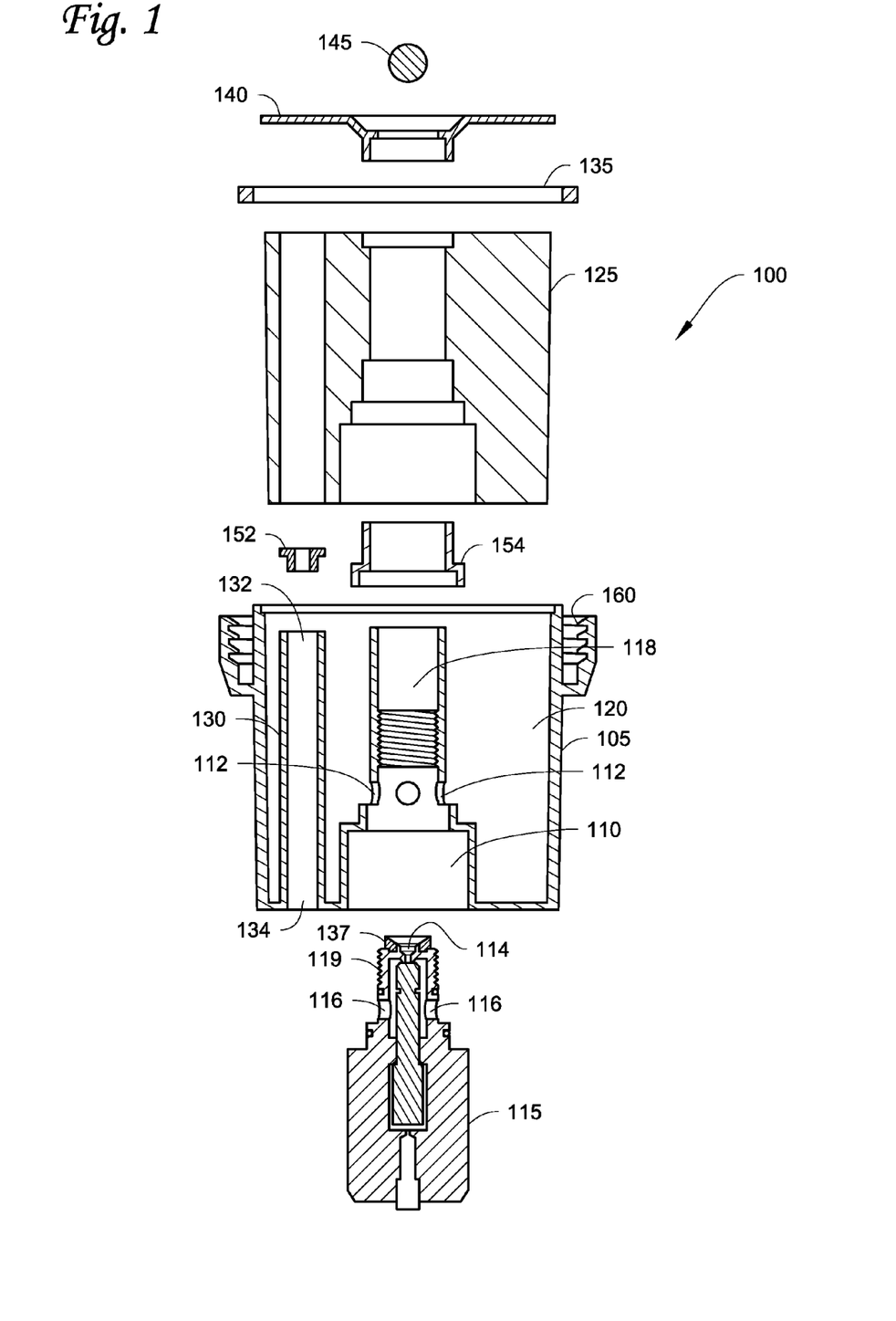
FIG. 1 shows an exploded cross-sectional view of one embodiment of an automatic draining system for use downstream of a fuel filter.
Figure 2A:
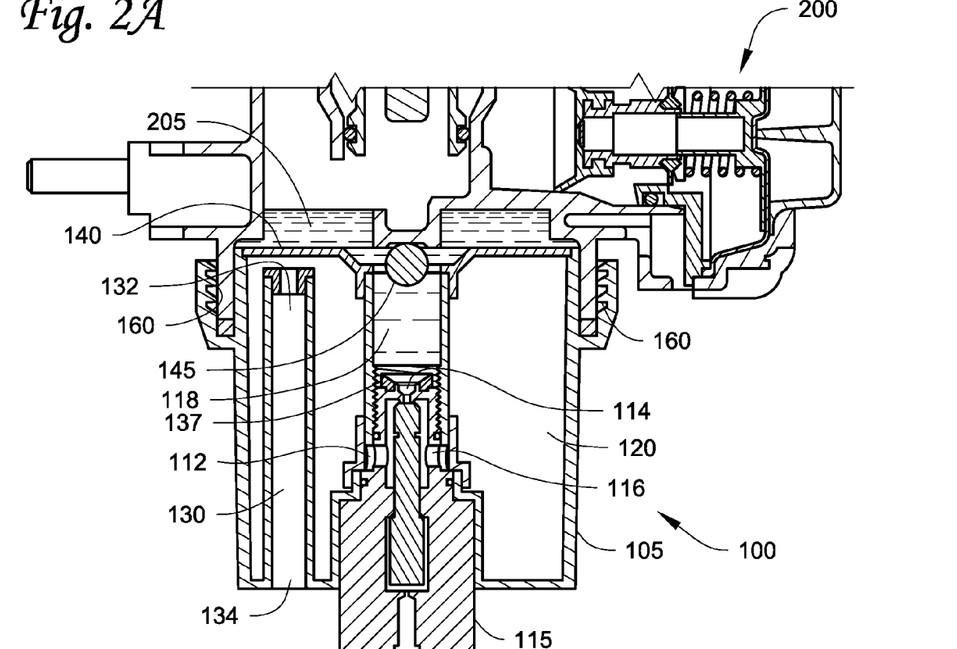
FIG. 2A shows a sectional view of one embodiment of an automatic draining system when the floating valve is floating and the solenoid valve is closed.
Figure 2B:
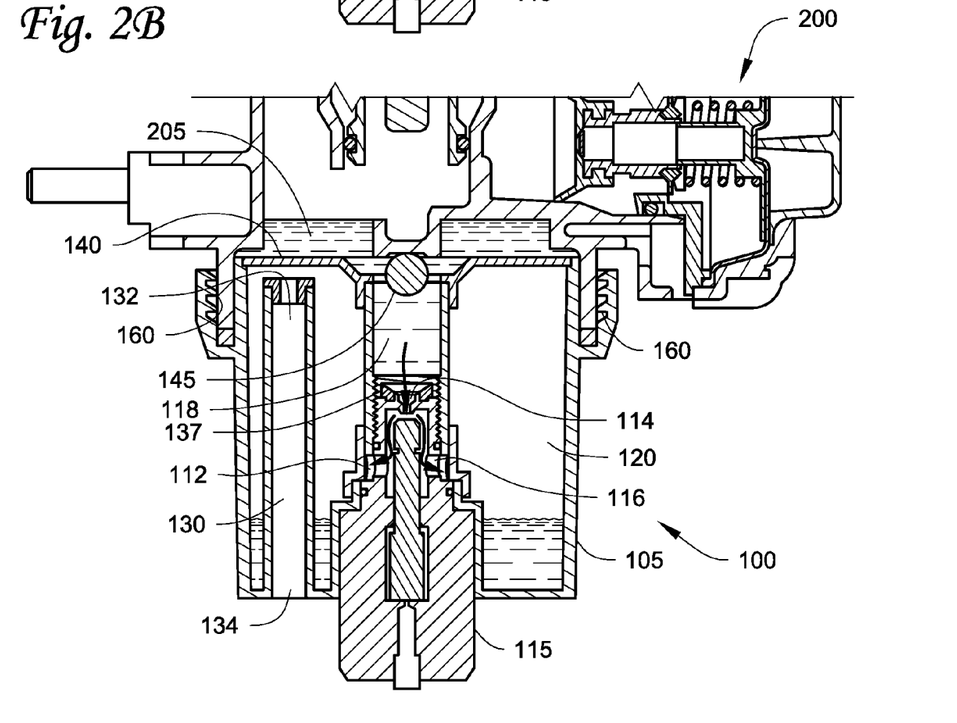
FIG. 2B shows a sectional view of one embodiment of an automatic draining system when the floating valve is floating and the solenoid valve is open.
Figure 2C:
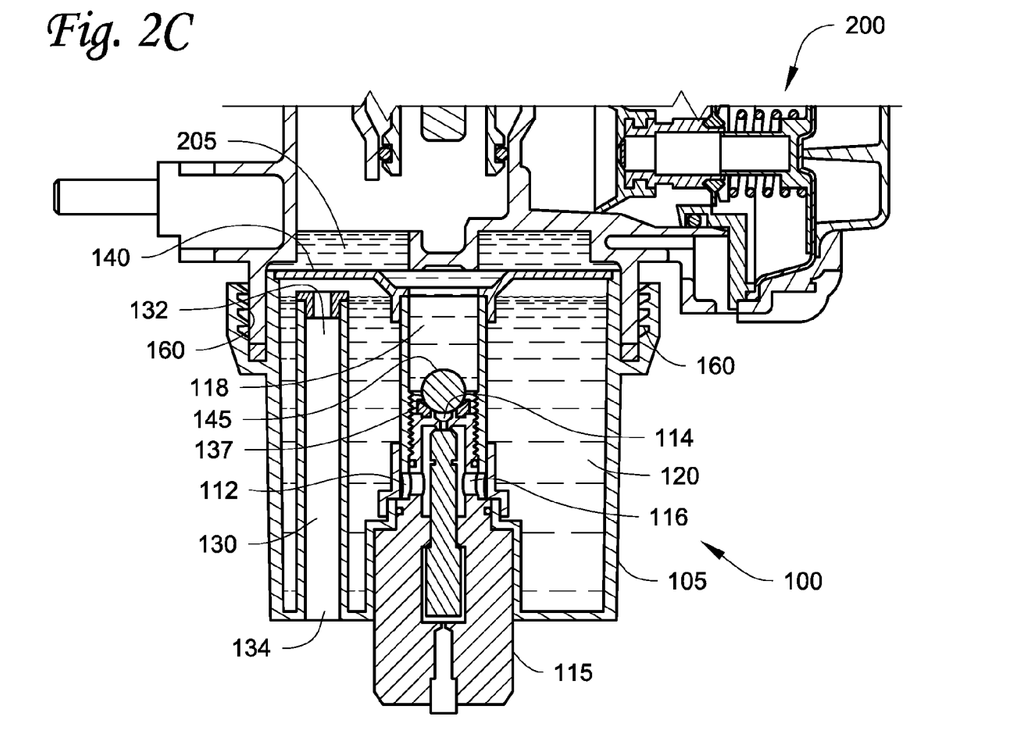
FIG. 2C shows a sectional view of one embodiment of an automatic draining system when the floating valve is in a sealing position.

FIGS. 1-2C illustrate one embodiment of a system for automatically draining water from a diesel fuel filter. As shown in FIGS. 1-2C, an automatic draining system 100 is provided that includes a housing 105 for housing a solenoid valve 115, a hydrocarbon filter media 125 and a floating valve 145. The housing 105 also includes a threading connection 160 that allows the automatic draining system 100 to removably attach to a diesel fuel filter system 200 downstream of a diesel fuel filter (not shown). As shown in FIGS. 2A-2C, the automatic draining system 100 is in communication with a sump 205 downstream of the diesel fuel filter (not shown) of the diesel fuel filter system 200.

As shown in FIG. 1, the interior of the housing 105 includes a first cavity 110 and a second cavity 120 that communicate via an opening 112. The first cavity 110 is open at the top and bottom ends of the housing 105 and is configured to fit the solenoid valve 115 near the bottom of the first cavity 110. Near the top of the first cavity 110 is a floating valve compartment 118 that houses the floating valve 145. The floating valve compartment 118 is in fluid communication with the sump 205. The second cavity 120 is designed to fit the hydrocarbon filter media 125 and is open at the top end of the housing 105, but is closed at the bottom end of the housing 105.

The housing 105 also includes an outlet tube 130 located in the second cavity 120 that extends from the bottom of the housing 105 to near the top of the housing 105. The outlet tube 130 has a first opening 132 within the housing 105 and near the top end of the housing 105 and a second opening 134 at the bottom end of the housing 105. A first screen 152 is provided to cover the first opening 132 to prevent the hydrocarbon filter media to migrate with the drained water to the ground. In one embodiment, the screen 152 is oleophobic and allows water to pass through the screen 152 easily while preventing diesel fuel from passing through.

The outlet tube 130 is configured to allow a liquid, such as water, that is located in the second cavity 120 to enter the first opening 132 through the first screen 152, flow through the outlet tube 130 and exit the housing 105 via second opening 134.

The automatic draining system 100 also includes a cover 140 that is attached to the top of the housing 105. The cover 140 is configured to cover the open portion of the second cavity 120 at the top of the housing 105 while leaving the open portion of the first cavity 110 at the top of the housing 105 open. A gasket 135 is used to seal the portion of the automatic draining system 100 where cover 140 attaches to the top of the housing 105.

In one embodiment, both the housing 105 and the cover 140 are formed with a plastic made of nylon 6/6 GF 30. However, in other embodiments, the housing 105 and the cover 140 can be made from other materials. Preferably, the housing 105 and the cover 140 are made with any polymer compatible with the fluid being drained and the fluid being filtered away, or any metallic material such as aluminum or coated steel.

The solenoid valve 115 is disposed within the first cavity 110 and includes a top opening 114 and a side opening 116 that is configured to align with the opening 112. In some embodiments, the solenoid valve 115 includes a threaded connection 119 that allows the solenoid valve 115 to be removably disposed within the interior of the first cavity 110. The solenoid valve 115 opens and closes the side opening 116 based on a signal received from a Water In Filter (WIF) sensor (not shown) located in the sump 205 (shown in FIGS. 2A and 2B). The automatic draining system 100 is configured to keep the physical size of the solenoid valve 115 as small as possible and to keep the current drawn by the solenoid valve 115 as low as possible. For example, the solenoid valve 115 is configured to draw between 9 and 24 amps when energized.

A second screen 154 is provided to cover the side opening 116 of the solenoid valve 115. In one embodiment, the screen 154 is oleophobic and hydrophilic to allow water to pass through the screen 154 easily while preventing diesel fuel from passing through.

The filter media 125 is disposed within the second cavity 120. In one embodiment, the filter media 125 is an Activated Carbon filter media.

The floating valve 145 is spherically shaped with a density less than water and greater than the diesel fuel (i.e. polyethylene). In other embodiments, the floating valve 145 is cylindrically shaped. The floating valve 145 is located upstream the solenoid valve 115 inside the floating valve compartment 118 and is provided to close the top opening 114. A sealing gasket 137 is provided at the top opening 114 and seals the perimeter of the top opening 114 when floating valve 145 is set onto the top opening 114. The seal created by the seal gasket 137 and the floating valve 145 prevents diesel fuel from passing through the solenoid valve 115 to the filter media 125.

As shown in FIG. 2A, when the solenoid valve 115 is closed, water is collected in the sump 205 and the floating valve compartment 118. The floating valve 145 is floating in the compartment 118 and water is allowed to enter the solenoid valve 115, but cannot exit through the side opening 116 because the solenoid valve 115 is closed.

When the water collected in the sump 205 reaches a level to trigger the WIF sensor (not shown), the WIF sensor sends a signal to open the solenoid valve 115. With the solenoid valve 115 open, water passes through the side opening 116 and the second screen 154 to the filter media 125. Due to the density of the floating valve 145, as the diesel fuel starts to enter the sump 205 and get closer to the solenoid valve 115, the floating valve 145 will set onto the top opening 114 to prevent the diesel fuel from entering the solenoid valve 115.

The water collects inside the second cavity 120 and is filtered by the filter media 125. Water remains in the second compartment 120 until the water level reaches near the top of the housing 105. As shown in FIG. 2C, when the water reaches the top of the outlet tube 130, the water passes through the first screen 152 and enters the first opening 132 whereby the water passes through the outlet tube 130 exits the engine system 200 and the automatic draining system 100. The first opening 132 is placed near the top of the housing 105 in order to increase the contact time between the water and the filter media 125 to increase the efficiency and the capacity of the filter media 125.

The floating valve 145 also acts as a safety valve when the solenoid valve 115 fails and leaves the side opening 116 open. For example, when the engine is on and the amount of water in the second cavity 120 creates a pressure side application, the system pressure causes the floating valve 145 to remain in a sealing position on the top opening 114 to prevent diesel fuel from entering the solenoid valve 115 and leaking out of the automatic draining system 100. In another example, when the engine is on and the amount of water in the second cavity 120 creates a suction side application, the system pressure will cause the water in the second cavity 120 to push the floating valve 145 out of a sealing position on the top opening 114 so that water in the second cavity 120 travels back into the sump 205. In yet another example, when the engine is off and regardless of the amount of water in the second cavity 120 (i.e. regardless of a pressure side application or a suction side application), the floating valve 145 will allow water to flow back to the sump 205 until the amount of water in the second cavity 120 and the amount of water in the sump 205 are at equilibrium.

Figure 3:
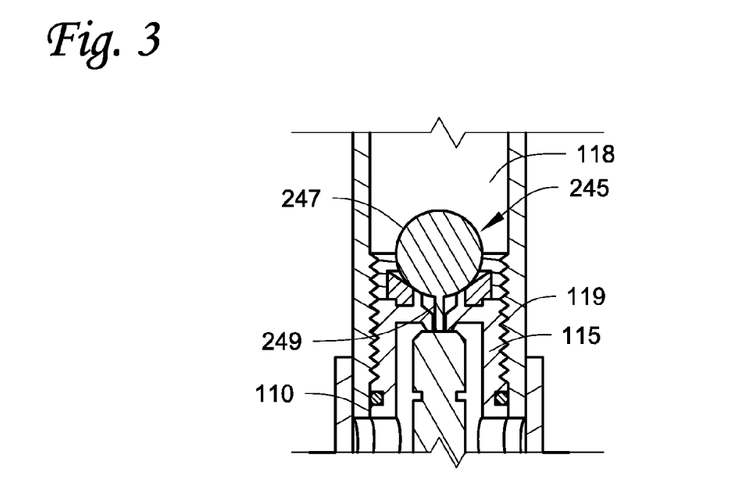
FIG. 3 shows a zoomed in view of another embodiment of a floating valve.

FIG. 3 is an exploded view of the first cavity 110 where the bottom of the floating valve compartment 118 and the solenoid valve 115 meet. Particularly, FIG. 3 shows another embodiment of a floating valve 245 that can be used in the automatic draining system 100. The floating valve 245 includes a valve portion 247 and a pin portion 249. The valve portion 247 can be either spherically shaped, as shown in FIG. 3, or cylindrically shaped (not shown). The pin portion 249 prevents the valve portion 247 from staying at a sealing position on the top opening 114 due to system pressure, when there is water surrounding the pin portion 249.

Figure 4:
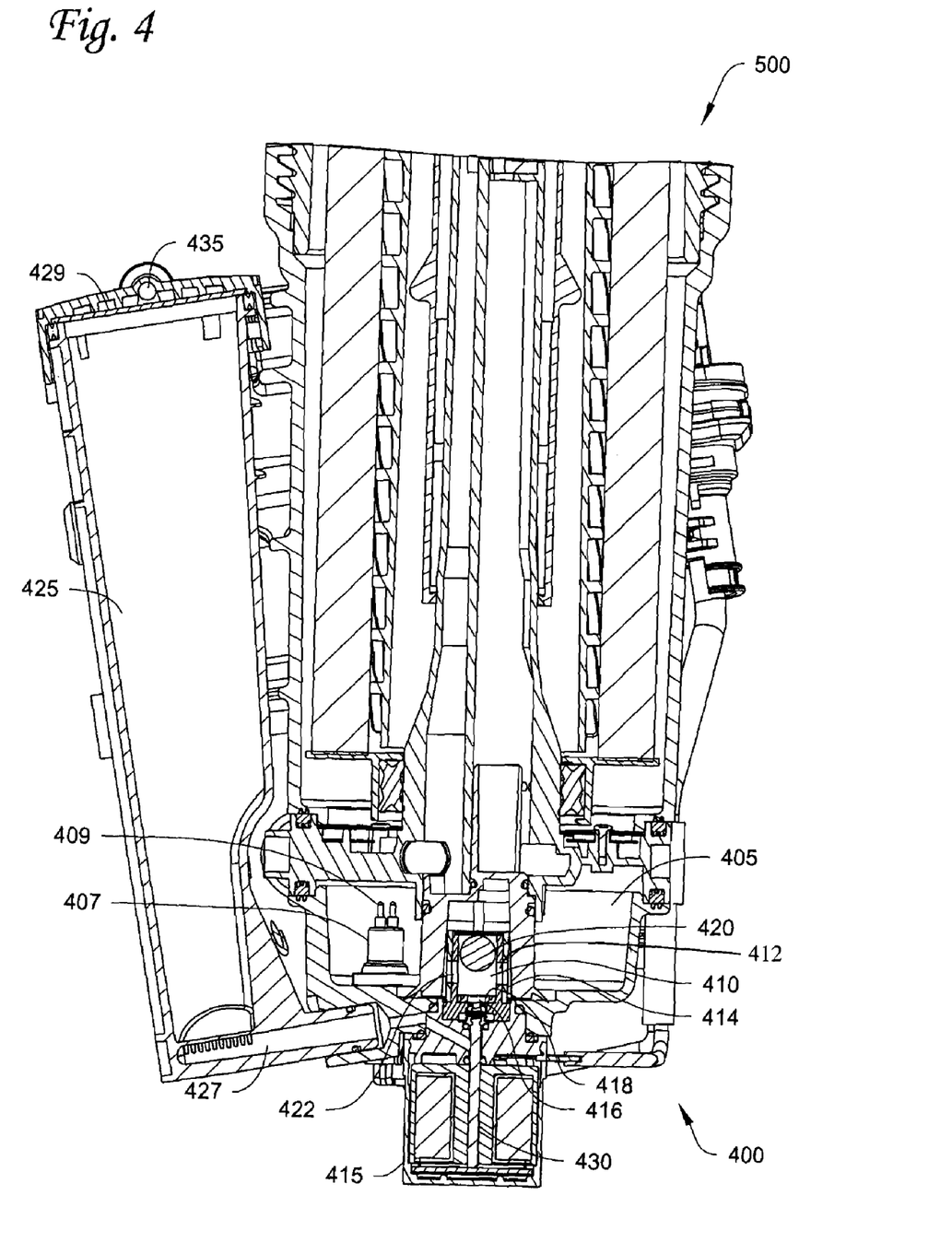
FIG. 4 shows a sectional view of a diesel fuel filter system and an automatic draining system according to another embodiment.
Figure 5A:
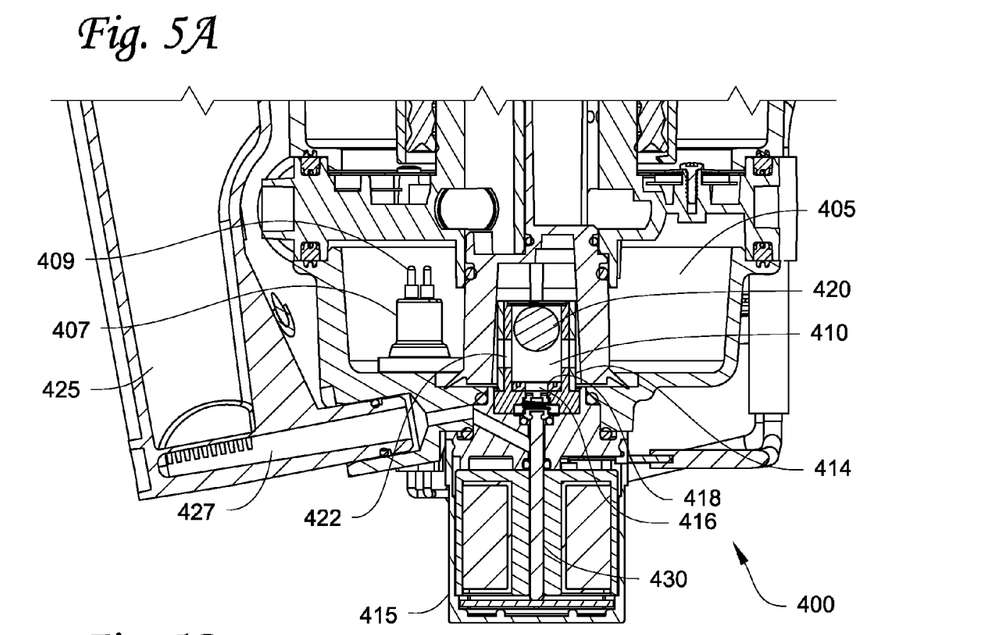
FIG. 5A shows a sectional view of another embodiment of an automatic draining system when the floating valve is floating and the solenoid valve is closed.
Figure 5B:
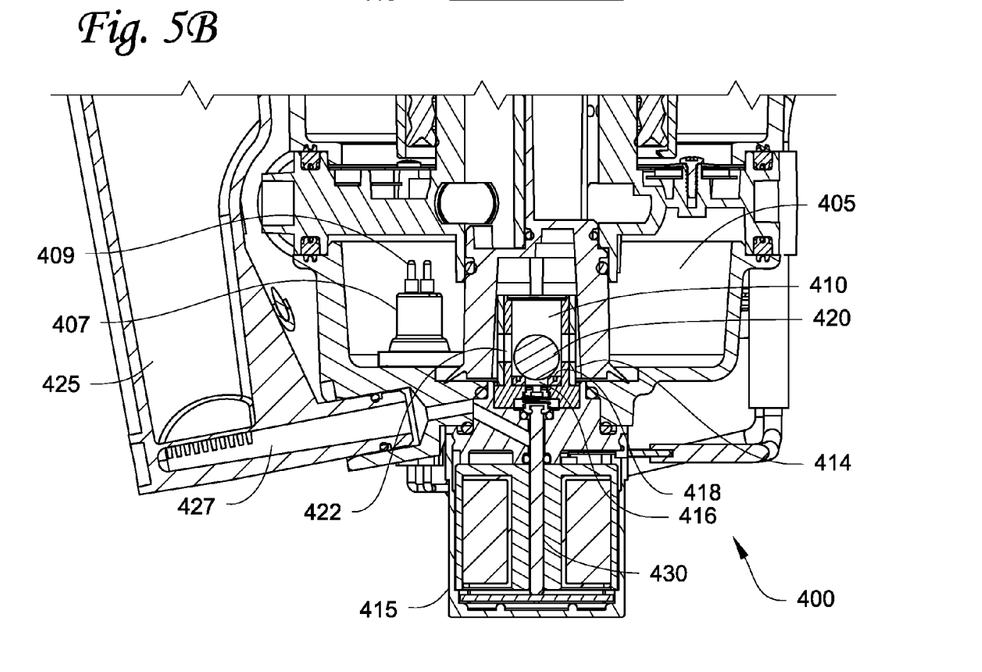
FIG. 5B shows a sectional view of another embodiment of an automatic draining system when the floating valve is in a sealing position.
Figure 5C:
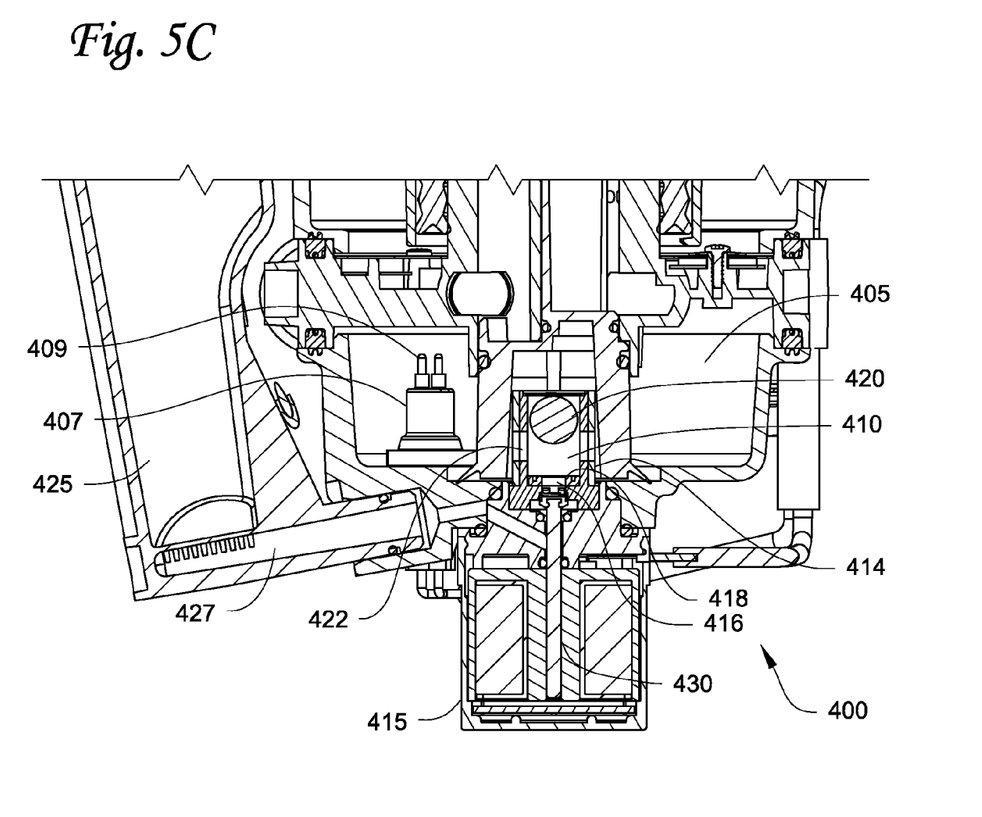
FIG. 5C shows a sectional view of another embodiment of an automatic draining system when the floating valve is floating and the solenoid valve is open.

FIGS. 4-5C illustrate a second embodiment for automatically draining water from a diesel fuel filter. As shown in FIG. 4, an automatic draining system 400 is provided downstream a diesel fuel filter system 500. The automatic draining system 400 includes a sump 405, a solenoid valve 415, a floating valve 420 and a hydrocarbon filter 425. Also, the automatic draining system 400 is removably attached to the diesel fuel filter system 500.

Figure 8:
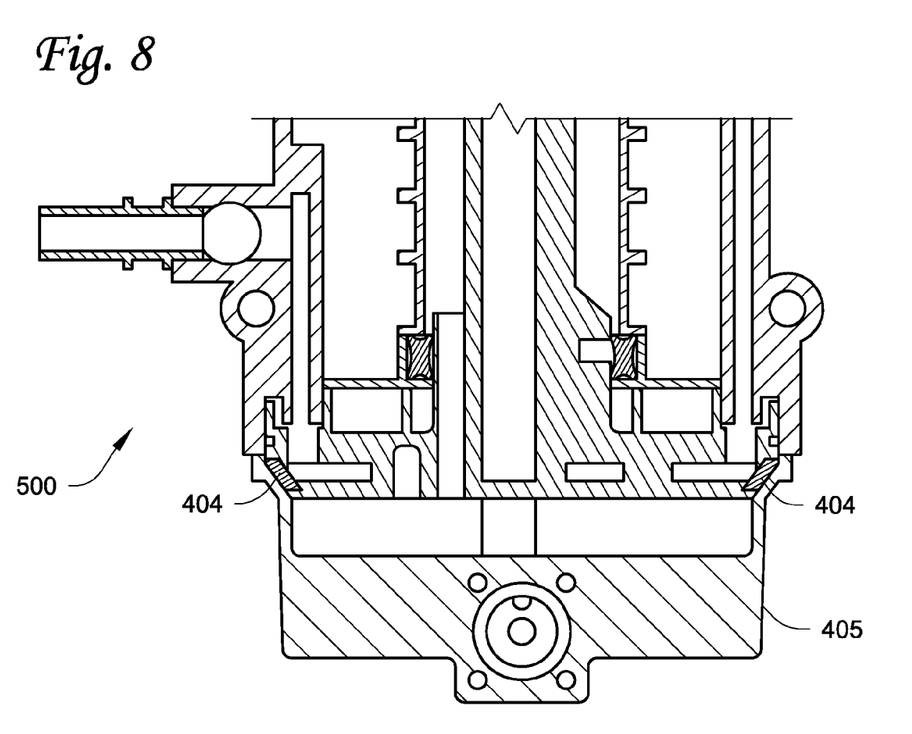
FIG. 8 shows a sectional view of a water sump removably attached to a fuel filter system.

The sump 405 is in fluid communication with the diesel fuel filter system 500. Within the sump 405 is a floating valve compartment 410 with a side opening 412 that allows fluid to travel from the sump 405 into the floating valve compartment 410. As shown in FIG. 8, the sump 405 is removably attached to the fuel filter system 500. Further, seals 404 are provided at or near the connection between the fuel filter system 500 and the sump 405 to ensure that any liquid (including, for example, fuel and water) is prevented from leaking out of the fuel filter system 500 or the sump 405 when the sump 405 is attached to the fuel filter system 500.

The sump 405 also includes a WIF sensor 407 with WIF pins 409 that measure a change in resistance in the sump 40 to determine the amount of water in the sump 405. In other embodiments, other types of WIF sensor can be used. The WIF sensor 407 is configured to send a signal to open and/or close the solenoid valve 415.

The floating valve compartment 410 houses the floating valve 420 and includes a bottom opening 416 that is in fluid communication with the solenoid valve 415. The floating valve 420 is spherically shaped. However, in some embodiments, the floating valve 420 is cylindrically shaped. Also, in some embodiments, the floating valve 420 includes a pin portion (not shown) protruding from the floating valve 420, like the floating valve 245 shown in FIG. 3.

A floating valve seal 418 is provided at the bottom opening 416 and seals the perimeter of the bottom opening 416 when the floating valve 420 is set onto the bottom opening 416. The seal created by the floating valve seal 418 and the floating valve 420 prevents diesel fuel from passing through the solenoid valve 415 to the hydrocarbon filter 425. The floating valve compartment 410 also includes a screen 414 that filters water that enters the floating valve compartment 410 via the side opening 412. The screen 414 is oleophobic and allows water to pass through the screen 414 easily while preventing diesel fuel from passing through. Particularly, the screen 414 has a size of 1-50 microns and is designed to reduce the ppm level of fuel in the water before the water is drained to the hydrocarbon filter 425.

The solenoid valve 415 includes a solenoid plunger 430 that opens and closes a solenoid opening 422 that allows fluid to pass from the solenoid valve 415 to the hydrocarbon filter 425 via a passageway 427 of the hydrocarbon filter 425. The solenoid valve 415 is removably attached to the automatic draining system 400.

If the solenoid valve 415 malfunctions and leaves the solenoid opening 422 open while the sump 405 is filled with fuel, the floating valve 420 will act as a safety valve and prevent the fuel from passing through the bottom opening 416 to the solenoid valve 415. Also, the automatic draining system 400 is configured to keep the physical size of the solenoid valve 415 as small as possible and to keep the current drawn by the solenoid valve 415 as low as possible. For example, the solenoid valve 415 is configured to draw between 9 and 24 amps when energized.

The hydrocarbon filter 425 includes activated carbon filter media (not shown) and extends vertically adjacent the fuel filter system 500. The hydrocarbon filter 425 is removably attached to the rest of the automatic draining system 400 via the passageway 427. The hydrocarbon filter 427 is also removably attached to the fuel filter system 500.

As shown in FIG. 4, a drainage outlet 435 is provided near the top of the hydrocarbon filter 425. Filter media 429 with activated carbon is also provided at the drainage outlet 435 as a final filtration stage before the water exits the automatic draining system 400. The drainage outlet 435 is provided near the top of the hydrocarbon filter 425 so that water fills almost the entire hydrocarbon filter 425 before draining out of the drainage outlet 435 and the automatic draining system 400. By positioning the drainage outlet 435 near the top of the hydrocarbon filter 425, the contact time between the water and the activated carbon of the filter media 429 is increased.

Similar to the floating valve 145 shown in FIGS. 1-2C, the floating valve 420 is a ball with a density less than water and greater than the diesel fuel. The floating valve 420 is located upstream the solenoid valve 415 inside the floating valve compartment 410 and is provided to close the bottom opening 415. The floating valve 420 is configured to allow water to enter the solenoid valve 415 while preventing diesel fuel from entering the solenoid valve 415 and draining out of the automatic draining system 400.

Figure 6:
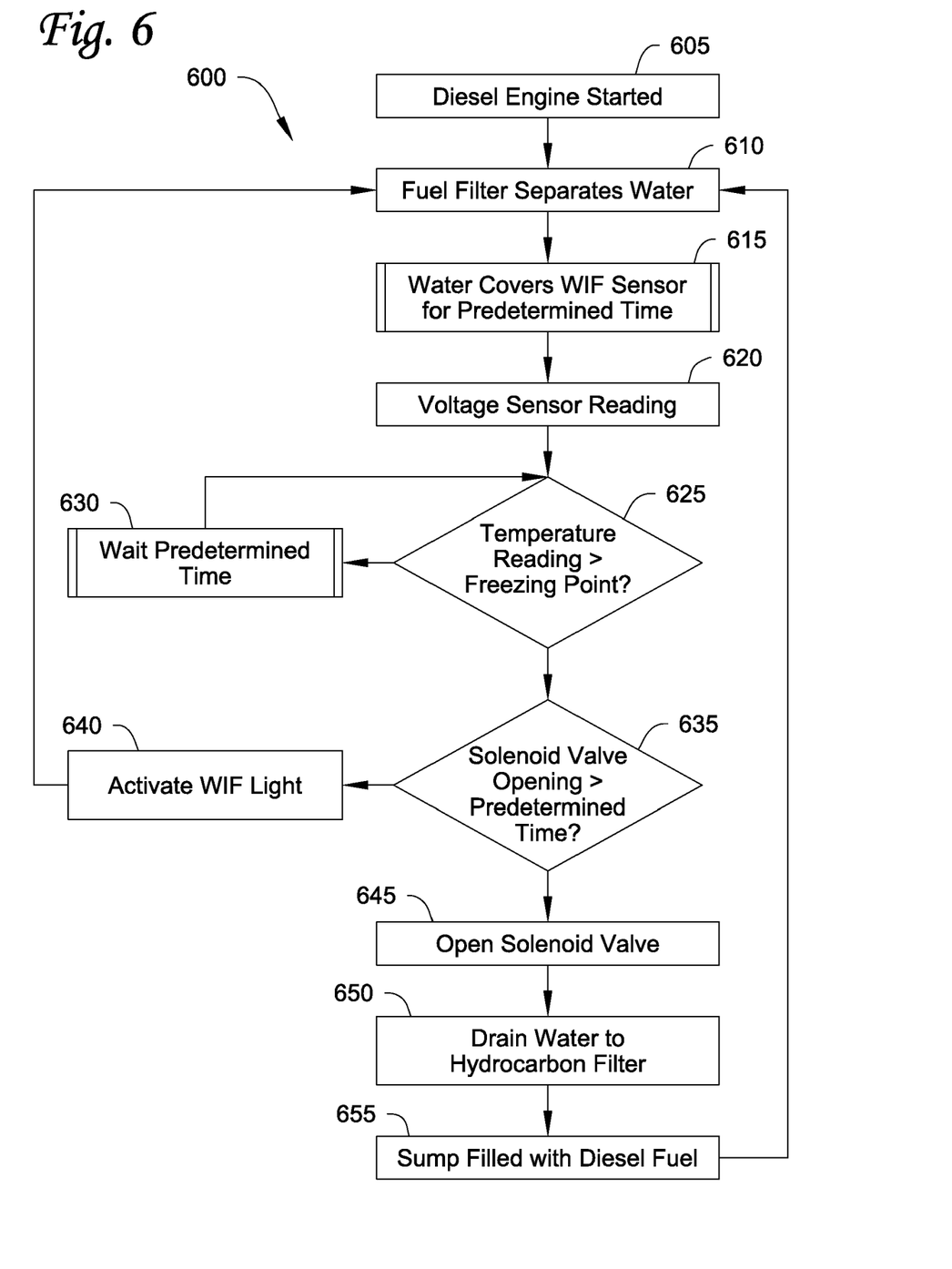
FIG. 6 shows a flowchart for operating an automatic draining system.

FIG. 6 is a flowchart 600 for automatically draining water from a diesel powered engine (not shown) that uses the automatic draining system 400 and the diesel fuel filter system 500 (shown in FIGS. 4-5C). The flowchart 600 begins at step 605 where the diesel powered engine is started. When the engine is started, if the solenoid valve 415 was energized, the solenoid valve 415 is then de-energized, thereby closing the solenoid 422 opening. During this time, the maximum deferential pressure in the sump 405 is 15 bars. The pressure in the hydrocarbon filter 425 and the passageway 422 is approximately 1 atm. As shown in FIG. 5A, during this period, the sump 405 is filled with diesel fuel and the WIF sensor 407 is surrounded by the diesel fuel. The flowchart 600 then proceeds to step 610.

At step 610, the fuel filter system 500 begins to filter the diesel fuel thereby separating water from the fuel. As water is separated from the fuel, the water is accumulated in the sump 405. The water in the sump 405 causes the floating valve 420 to float, which allows water to enter the bottom opening 416. However, as the solenoid valve 415 is de-energized, the water is not able to enter the solenoid opening 422 and travel to the hydrocarbon filter 425. The flowchart 600 then proceeds to step 615.

At step 615, the engine control unit (ECU) (not shown) waits for the water to accumulate into the sump 405 up to a level that the WIF pins 409 of the WIF sensor 407 are covered by the water for a specified period of time. For example, in one embodiment, the specified period of time is five consecutive minutes. When the WIF pins 409 of the WIF sensor 407 are covered by the water for the specified period of time, the flowchart 600 proceeds to step 620.

At step 620, the ECU reads a voltage sensor (not shown) for solenoid valve control purposes. The flowchart 600 proceeds to step 625.

At step 625, the ECU checks the temperature of the water in the sump 405. If the temperature of the water is less than or equal to the freezing point temperature of the water (i.e. 32° F.), the flowchart 600 proceeds to step 630. If the temperature is greater than the freezing point of the water (i.e. 32° F.), the flowchart 600 proceeds to step 635. By ensuring that the temperature of the water in the sump 405 is greater than the freezing point of the water (i.e. 32° F.), frozen water entering the hydrocarbon filter is avoided.

At step 630, the ECU waits for a specified period of time and then returns to step 625 to see if the temperature of the water in the sump 405 is greater than the freezing point of the water (i.e. 32° F.). For example, in one embodiment, the specified period of time is 10 minutes. At step 635, the ECU determines the amount of time that has passed since the last time the solenoid valve 415 was energized and the solenoid opening 422 was opened. If the amount of time that has passed is less than a predetermined period of time, the flowchart 600 proceeds to step 640. If the amount of time that has passed is greater than one hour, the flowchart 600 proceeds to step 645. In one embodiment, the predetermined period of time is one hour.

At step 640, the WIF maintenance light (not shown) is turned on to notify the operator that there may be a maintenance issue the automatic draining system 400. The flowchart 600 then returns to step 610.

At step 645, the ECU sends a signal to energize the solenoid valve 415 for one second and allow water to pass through the solenoid opening 422. The flowchart 600 then proceeds to step 650.

At step 650, the solenoid valve 415 is energized and the solenoid opening 422 is opened for a specified period of time. For example, in one embodiment, the solenoid opening 422 is opened for approximately 1 second in order to allow one-third (⅓) of the water accumulated in the sump 405 to drain into the hydrocarbon filter 425 via the passageway 427. Consequently, the water level in the sump 405 begins to drop and the deferential pressure in the sump 405 is lowered. The automatic draining system 400 is configured so that after the solenoid valve is de-energized, the amount of water remaining in the sump 405 is small enough that the floating valve 420 seals the bottom opening 416. The flowchart 600 then proceeds to step 655.

At step 655, diesel fuel again fills the sump 405. The ECU no longer takes any action, and the flowchart 600 then proceeds back to step 610.

Figure 7:
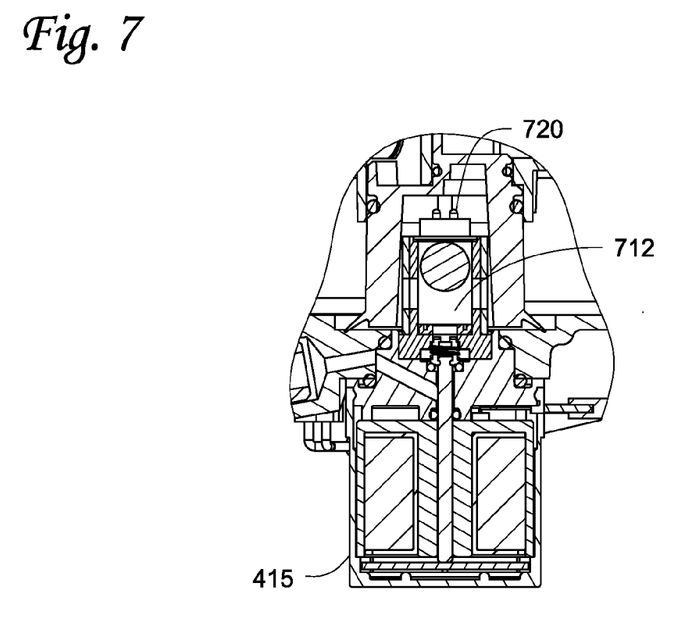
FIG. 7 shows a zoomed in view of another embodiment of a floating valve compartment according to yet another embodiment.

FIG. 7 shows an exploded view of another embodiment of a floating valve compartment 712 in the automatic draining system 400. The floating valve compartment 712 includes a WIF sensor 720 integrated with the solenoid valve 415. By placing the WIF sensor 720 in the floating valve compartment 712, the WIF sensor 720 can provide a more accurate measurement of the amount of water in the sump 405, especially when the diesel fuel filter system 500 and the automatic draining system 400 are at an inclined surface.

The invention may be embodied in other forms without departing from the spirit or novel characteristics thereof. The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. An automatic draining system for draining a first fluid from a filter, the automatic draining system comprising:
    a floating valve housed within a floating valve compartment having a floating valve opening, the floating valve having a density less than a first fluid and a density greater than a second fluid, wherein the floating valve is in a floating position when the floating valve compartment is filed with the first fluid allowing the first fluid to pass through the floating valve opening, and the floating valve is in a sealing position when the floating valve compartment is not filled with the first fluid, thereby preventing the first fluid and the second fluid from passing through the floating valve opening;
    a solenoid valve downstream of and in fluid communication with the floating valve compartment via the floating valve opening, the solenoid valve having a solenoid opening that is open when the solenoid valve is energized and is closed when the solenoid valve is de-energized;
    a first fluid collection cavity disposed downstream of and in fluid communication with the solenoid valve via the solenoid valve opening; wherein the first fluid collection cavity includes a drainage outlet for removing the first fluid contained within the first fluid cavity, the drainage outlet including an opening near a top end of the first fluid collection cavity configured to allow the first fluid to enter the drainage outlet when the first fluid approaches the top end of the first fluid collection cavity; and
    a filter media disposed in the first fluid collection cavity, wherein the filter media filters the first liquid prior to the first liquid exiting the automatic draining system.

2. The automatic draining system of claim 1, wherein the filter media is a hydrocarbon filter media and is housed in a hydrocarbon filter.

3. The automatic draining system of claim 2, wherein the hydrocarbon filter is configured to be detachable from the automatic draining system.

4. The automatic draining system of claim 1, further comprising a sump that is upstream of and in fluid communication with the floating valve compartment.

5. The automatic draining system of claim 4, wherein the sump is in fluid communication with a fuel filter system.

6. The automatic draining system of claim 4, wherein the sump is configured to be detachable from the automatic draining system.

7. The automatic draining system of claim 1, further comprising a first fluid-in-filter sensor that measures the amount of the first fluid upstream of the solenoid valve opening and generates a signal to energize the solenoid valve when the amount of the first fluid measured by the first fluid-in-filter sensor reaches a first level.

8. The automatic draining system of claim 7, wherein the first fluid-in-filter sensor is disposed within the sump.

9. The automatic draining system of claim 1, wherein the solenoid valve comprises a first fluid-in-filter sensor that measures the amount of the first fluid attempting to pass through the solenoid valve opening and generates a signal to energize the solenoid valve when the amount of the first fluid measured by the first fluid-in-filter sensor reaches a first level.

10. The automatic draining system of claim 1, wherein the floating valve is spherically shaped.

11. The automatic draining system of claim 1, wherein the floating valve is cylindrically shaped.

12. The automatic draining system of claim 1, wherein the floating valve includes a pin portion projecting out from the floating valve, the pin portion being configured to prevent the floating valve from remaining in the sealing position when the floating valve is surrounded by the first fluid.

13. The automatic draining system of claim 1, further comprising a screen upstream of the filter, wherein the screen is oleophobic and allows the first fluid to pass through the screen easily while preventing the second fluid from passing through.

14. The automatic draining system of claim 1, wherein the solenoid valve is configured to be detachable from the automatic draining system.

15. The automatic draining system of claim 1, wherein the drainage outlet is an outlet tube for removing the first fluid contained within the first fluid cavity, the outlet tube having the opening near the top end of the first fluid collection cavity and a second opening at a bottom end of the first fluid collection cavity, the opening configured to allow the first fluid to enter the outlet tube when the first fluid approaches the top end of the first fluid collection cavity.

16. A method for automatically draining a first fluid from a first fluid collection cavity having a first fluid filter using an automatic draining system, the method comprising:
    moving a floating valve that has a density less than the first fluid and greater than a second fluid to a floating position by filling a floating valve compartment with the first fluid;
    energizing a solenoid valve to allow the first fluid to enter the first fluid filter of the first fluid collection cavity via a solenoid opening, wherein the solenoid valve is energized when the amount of the first fluid upstream the solenoid valve reaches a first level; and filtering the first fluid in the first fluid filter;

draining the first fluid out of the first fluid filter first fluid collection cavity via a drainage outlet when the first fluid contained within the first fluid collection cavity approaches a top end of the first fluid collection cavity.

17. The method of claim 16, further comprising measuring a temperature of the first fluid in a sump upstream of the floating valve compartment, and energizing the solenoid valve when the temperature of the first fluid is greater than the freezing point of the first fluid.

18. The method of claim 16, wherein the solenoid valve is energized only when the amount of the first fluid upstream the solenoid valve reaches the first level for a first period of time.

19. A combined fluid filter system and automatic draining system comprising:

a combined fluid filter system comprising:

a fluid filter for separating a first fluid from a second fluid;

an automatic draining system comprising:

a floating valve housed within a floating valve compartment having a floating valve opening, the floating valve having a density less than the first fluid and a density greater than the second fluid, wherein the floating valve is in a floating position when the floating valve compartment is filed with the first fluid allowing the first fluid to pass through the floating valve opening, and the floating valve is in a sealing position when the floating valve compartment is not filled with the first fluid, thereby preventing the first fluid and the second fluid from passing through the floating valve opening;

a solenoid valve downstream of and in fluid communication with the floating valve compartment via the floating valve opening, the solenoid valve having a solenoid opening that is open when the solenoid valve is energized and is closed when the solenoid valve is de-energized; and a first fluid collection cavity downstream of and in fluid communication with the solenoid valve via the solenoid valve opening, wherein the first fluid collection cavity includes a drainage outlet for removing the first fluid contained within the first fluid cavity, the drainage outlet including an opening near a top end of the first fluid collection cavity configured to allow the first fluid to enter the drainage outlet when the first fluid approaches the top end of the first fluid collection cavity; and a filter media disposed within the first fluid collection cavity, wherein the filter media filters the first liquid prior to the first liquid exiting the automatic draining system;

wherein the automatic draining system is irremovably attached to the fuel filter system.

20. The combined fluid filter system and automatic draining system of claim 19, wherein the automatic draining system includes a first fluid-in-filter sensor that measures the amount of the first fluid upstream of the solenoid valve opening and generates a signal to energize the solenoid valve when the amount of the first fluid measured by the first fluid-in-filter sensor reaches a first level.

21. The combined fluid filter system and automatic draining system of claim 20, further comprising a sump that is upstream of and in fluid communication with the floating valve compartment, and wherein the first fluid-in-filter sensor is disposed within the sump.

* * * * *